Feb. 21, 1967 P. R. GEISSLER 3,304,767
METHOD FOR DETERMINING THE CRITICAL
RELATIVE HUMIDITY OF FERTILIZER
Filed Dec. 23, 1964
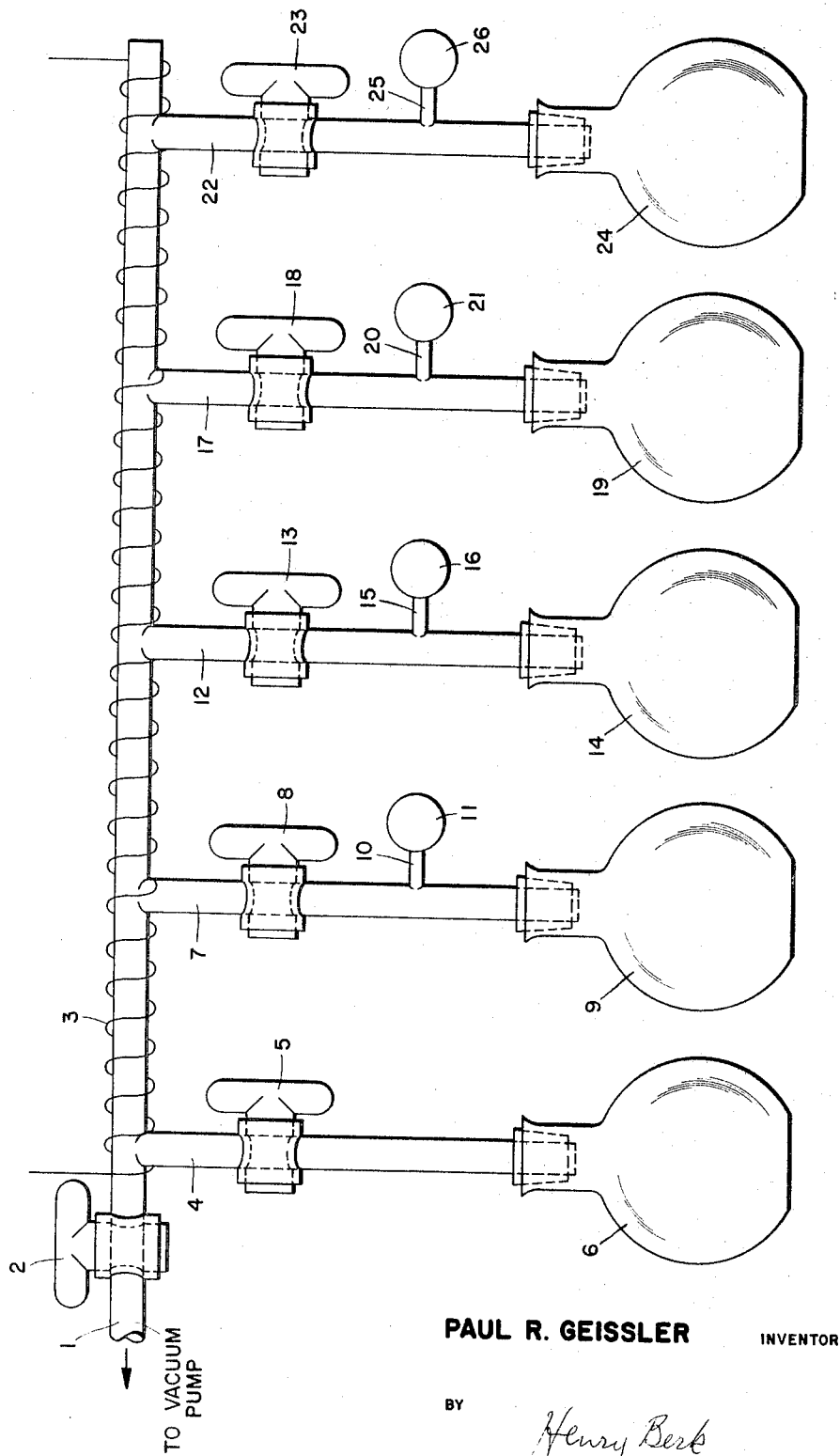
PAUL R. GEISSLER INVENTOR
BY *Henry Berk*
PATENT ATTORNEY

United States Patent Office 3,304,767
Patented Feb. 21, 1967

3,304,767
METHOD FOR DETERMINING THE CRITICAL RELATIVE HUMIDITY OF FERTILIZER
Paul R. Geissler, Metuchen, N.J., assignor to Esso Research and Engineering Company, a corporation of Delaware
Filed Dec. 23, 1964, Ser. No. 420,657
11 Claims. (Cl. 73—73)

This invention is directed to a method and apparatus for determining the critical relative humidities of fertilizers. In particular, this invention is directed to a process and apparatus for determining the critical relative humidities of mixed fertilizer by measuring the equilibrium vapor pressures of water-fertilizer systems in an evacuated system.

The critical relative humidity of a substance is that relative humidity above which the substance will absorb water from the atmosphere and below which the substance will effloresce. Since the absorption of water by a fertilizer can cause caking or wetting, it is important in the manufacture of the fertilizer to know at what humidity such absorption will occur so that the fertilizer can be protected during storage and shipping.

Heretofore in the art, various methods have been used to determine the relative humidity at which a fertilizer will absorb water from the atmosphere. One method has been the use of an isoteniscope which is used to measure the vapor pressure of a saturated solution. The use of such an instrument has many drawbacks for determining the critical relative humidity of a multicomponent or mixed fertilizer. The major disadvantage of the isoteniscope is the fact that it is very difficult to determine at what point a solution is completely saturated with respect to all of the various components of a multicomponent fertilizer. It is also limited by the fact that in its usual application, it measures the vapor pressures of systems that contain much more water than is present in fertilizers under actual storage conditions, and the critical relative humidity of a given multicomponent fertilizer will not be the same at all water concentrations.

In another prior method, the relative humidity of a fertilizer is determined by using an electric hygrometer as set forth in Industrial and Engineering Chemistry, vol. 16, No. 6, June 1944, pp. 367–369. This procedure has several distinct disadvantages in that it requires a large amount of sample fertilizer and frequent calibration of the hygrometer.

It has now been found that the critical relative humidity of multicomponent fertilizers can be easily and particularly determined by utilizing the vacuum technique hereinafter described. The technique of this invention measures the equilibrium vapor pressure of saturated solutions that are formed on the surfaces of fertilizers by the absorption of water. This overcomes the major disadvantages of utilizing an isoteniscope in that the amount of water present is insufficient to completely dissolve any of the components of the fertilizer. Also, the critical relative humidity can be measured at low water concentrations which are the concentrations found in the actual storage of fertilizers. In the procedures of this invention, the vapor pressure is measured by utilizing a manometer filled with dibutyl phthalate, but may in practice be measured by any suitable pressure measuring device.

In the practice of this invention, the critical relative humidity of a mixed fertilizer is determined by placing a small sample, that is, about 0.5 to 5.0 grams, preferably, 1 to 2 grams, in a container which is connected through conduits to a water reservoir, said conduits being fitted with valves to open and close the conduits, said conduits, in addition, being connected to a vacuum pump with which the system can be evacuated. The valve to the water reservoir is first closed and the container containing the fertilizer sample is evacuated to less than 0.001 mm. of mercury absolute. The system is then isolated and the valve to the water reservoir is open so that pure deaerated water vapor can enter the sample chamber. The water reservoir valve is left open for a period of time from 0.25 to 5.0 minutes. The amount of water absorbed by the sample increases with the amount of time that the valve is left open and can be varied from 0.1 to 20% of the weight of the sample. The sample chamber is then isolated from the water reservoir and left to stand until an equilibrium is reached between the vapor in the sample chamber and the water absorbed on the surface of the fertilizer. The equilibrium pressure is then measured on a manometer utilizing dibutyl phthalate. The equilibrium pressure (equal to the vapor pressure of a saturated solution of the sample) divided by the vapor pressure of pure water at the temperature of the sample is the critical relative humidity of the fertilizer at that temperature.

The procedure can also be used by first saturating the fertilizer with a small amount of water and then evacuating and isolating the system. The pressure, when an equilibrium is reached between the water on the surface of the fertilizer and the vapor in the system, is the vapor pressure of a saturated solution of the sample in the container. This procedure and the absorption procedure first set forth give substantially identical results.

Referring now to the drawing, there is shown a schematic representation of one mode of conducting the process of this invention.

In the drawing there is set forth a conduit 1 connected to a vacuum pump, not shown, and fitted with a stopcock 2 with which the system can be isolated. The apparatus is wrapped with a heating element 3 in order to prevent condensation of the water vapor during the operation of the method. The heating element may be wrapped around conduit 1 or if condensation is present, conduits 4, 7, 12, 17 and 22 may also be wrapped with a heating element in order to prevent condensation. It is also to be understood that conduits 10, 15, 20 and 25 may also be heated in order to prevent condensation. The heating of conduits 4, 7, 12, 17 and 22, 10, 15 and 25 may not be necessary if condensation does not take place therein. The conduit 1 is connected to conduit 4 which communicates with the water reservoir 6. Conduit 4 is fitted with a stopcock 5 by means of which the water reservoir 6 can be isolated from the rest of the system. Conduit 1, in addition, communicates to a plurality of conduits which communicate with sample containers. The process can be conducted utilizing one or more sample containers. Preferably, 4 containers are used since this number is convenient. In the drawing, there are shown 4 sample containers connected to conduit 1. Conduit 7 communicates with sample container 9 and is fitted with stopcock 9. Conduit 7 is connected through conduit 10 to the dibutyl phthalate filled manometer 11. In like manner, sample container 14 is connected to vacuum conduit 1 by means of conduit 12 which is fitted with stopcock 13 and connects to manometer 16 through conduit 15. Conduit 17 connects vacuum conduit 1 with sample container 19. Conduit 17 is fitted with stopcock 18 and is connected to manometer 21 through conduit 20. There is also shown sample container 24 connected to conduit 1 by means of conduit 22 which is fitted with a stopcock 23. Conduit 22 is connected to manometer 26 which utilizes dibutyl phthalate through conduit 25. In the practice of this invention, the sample containers 9, 14, 19 and 24 are maintained at different temperatures. This can be done with conventional heating means such as steam trays, water baths or heating mantles.

The following examples are for purposes of illustration only and are not to be construed as a limitation upon the scope of the invention as set forth in the appended claims.

EXAMPLE 1

In order to more particularly describe the invention, a system was constructed in accordance with the drawing. The urea-ammonium nitrate mixture consisting of 5 grams urea and 5 grams ammonium nitrate was divided into four equal parts, dried and one part was placed in each of the four sample containers. Stopcocks 8, 13, 18 and 23 are opened and stopcock 5 is closed. The stopcock 2 is then opened and the 4 sample containers 9, 14, 19 and 24 are evacuated to a pressure of less than 0.001 mm. of mercury. Stopcock 2 is then closed thereby isolating the system. Stopcock 5 is then opened allowing the containers to fill with water vapor. Stopcocks 8, 13, 18 and 23 are then closed. An equilibrium was reached between the water on the surface of the fertilizer and the water vapor and this equilibrium pressure is the vapor pressure of the saturated solution of that sample at the temperature of the sample. The results of this test show that the critical relative humidity, that is, the value determined by dividing the vapor pressure of the saturated solution by the vapor pressure of pure water at the temperature of the sample for this fertilizer mixture, are 20% at 80° F., 15% at 86° F., 8% at 95° F. and 5% at 104° F.

EXAMPLE 2

A number of mixed fertilizers were tested in order to determine their critical relative humidities in accordance with the procedure set forth in Example 1. Each of the particular fertilizer compositions was run twice in order to ascertain the reproducibility of the process of this invention. The results are set forth below.

*Table I.—Critical relative humidity of monoammonium phosphate and diammonium phosphate mixtures at 30° C.*

|  | Percent |
|---|---|
| 9:1 ratio of mono to diammonium phosphate | 76.5 / 76.5 |
| 1:9 ratio of mono to diammonium phosphate | 77.0 / 77.0 |
| 1:1 ratio of mono to diammonium phosphate | 76.2 / 76.7 |
| 1:3 ratio of mono to diammonium phosphate | 77.0 / 77.1 |

*Table II.—Critical relative humidity of 1:1:1 mixtures of urea, KCl, and various monoammonium phosphate to diammonium phosphate ratios at 30° C.*

|  | Percent |
|---|---|
| 4:1 ratio of monoammonium to diammonium phosphate | 50.8 / 51.5 |
| 1:1 ratio of monoammonium to diammonium phosphate | 52.5 / 52.6 |
| 1:4 ratio of monoammonium to diammonium phosphate | 52.5 / 53.7 |

It is to be seen from a study of the two above tables that the process of this invention gives consistent results over a wide range of mixed fertilizers. This is consistent with phase rule considerations that predict that the critical relative humidity of mixtures at low water concentrations (so that all components are present in solid phase) should be independent of the ratio of the components.

What is claimed is:

1. A process for determining the critical relative humidity of a mixed fertilizer which comprises the steps of:
   (a) placing a sample of dried mixed fertilizer in a confined chamber,
   (b) reducing the pressure within said confined chamber to less than 0.001 mm. of mercury,
   (c) filling said chamber with pure degassed water vapor,
   (d) isolating the water vapor filled chamber, and
   (e) measuring the equilibrium pressure.

2. A process as in claim 1 wherein said sample is an 0.5 to 5.0 gram sample.

3. A process as in claim 1 wherein said equilibrium pressure is measured with a dibutyl phthalate manometer.

4. A process for determining the critical relative humidity of a mixed fertilizer which comprises the steps of:
   (a) placing a one gram sample of a mixed fertilizer in each of four confined chambers, said fertilizer comprising a 4:1 ratio of monoammonium phosphate to diammonium phosphate,
   (b) reducing the pressure in each of the four said confined chambers to less than 0.001 mm. of mercury,
   (c) filling each of the four said confined chambers with pure degassed water vapor,
   (d) isolating each of the four said confined chambers, and
   (e) measuring the equilibrium pressure in each of the said four confined chambers with a dibutyl phthalate manometer.

5. A process as in claim 4 wherein each of said confined chambers is maintained at a different temperature.

6. A process of determining the critical relative humidity of a mixed fertilizer which comprises the steps of:
   (a) placing a sample of mixed fertilizer in a sample chamber,
   (b) saturating the mixed fertilizer with water vapor,
   (c) evacuating the system to less than 0.001 mm. of mercury,
   (d) isolating the avacuated sample chamber, and
   (e) measuring the equilibrium pressure of the isolated sample chamber.

7. A process as in claim 6 wherein said sample weighs between about 0.5 to 5.0 grams.

8. A process as in claim 6 wherein said equilibrium pressure is measured with a dibutyl phthalate manometer.

9. A process as in claim 6 wherein said mixed fertilizer consists essentially of a mixture of monoammonium phosphate and diammonium phosphate.

10. A process of determining the critical relative humidity of a mixed fertilizer which comprises the steps of:
    (a) placing a one gram sample of a 1:3 ratio mixture of monoammonium phosphate to diammonium phosphate in each of four separate sample chambers,
    (b) saturating each of the four fertilizer samples with water vapor,
    (c) evacuating the system to a pressure less than 0.001 mm. of mercury,
    (d) isolating each of four evacuated sample chambers, and
    (e) measuring the equilibrium pressure in each of the four isolated sample chambers with a dibutyl phthalate manometer.

11. A process as in claim 10 wherein each of the said sample chambers are maintained at a different temperature.

References Cited by the Examiner

UNITED STATES PATENTS

| 2,061,424 | 11/1936 | Hutton | 73—29 |
| 2,413,565 | 12/1946 | Hewlett | 73—29 |
| 2,976,722 | 3/1961 | Heckly | 73—76 |

RICHARD C. QUEISSER, *Primary Examiner.*